United States Patent
Agarwal et al.

(10) Patent No.: US 8,018,955 B2
(45) Date of Patent: Sep. 13, 2011

(54) PROVIDING DYNAMIC CHANGES TO PACKET FLOWS

(75) Inventors: Kaitki Agarwal, Westford, MA (US); Rajat Ghai, Sandwich, MA (US)

(73) Assignee: Starent Networks LLC, Wilmington, DE (US)

( * ) Notice: Subject to any disclaimer, the term of this patent is extended or adjusted under 35 U.S.C. 154(b) by 0 days.

(21) Appl. No.: 11/953,000

(22) Filed: Dec. 7, 2007

(65) Prior Publication Data

US 2008/0137541 A1   Jun. 12, 2008

Related U.S. Application Data

(60) Provisional application No. 60/873,493, filed on Dec. 7, 2006.

(51) Int. Cl.
 *H04L 12/28* (2006.01)
 *H04L 12/56* (2006.01)
(52) U.S. Cl. ........ 370/401; 370/235; 370/236; 370/310; 370/395.2; 370/395.21; 709/228; 709/231
(58) Field of Classification Search .................. None
 See application file for complete search history.

(56) References Cited

U.S. PATENT DOCUMENTS

| | | | |
|---|---|---|---|
| 6,138,156 A | 10/2000 | Fletcher et al. | |
| 6,327,471 B1 | 12/2001 | Song | |
| 6,431,875 B1 | 8/2002 | Elliott et al. | |
| 6,477,590 B1 | 11/2002 | Habusha et al. | |
| 6,687,252 B1 | 2/2004 | Bertrand et al. | |
| 6,714,987 B1 | 3/2004 | Amin et al. | |
| 6,775,273 B1 | 8/2004 | Kung et al. | |
| 6,778,494 B1 | 8/2004 | Mauger et al. | |
| 6,810,259 B1 | 10/2004 | Zhang | |
| 6,847,991 B1 | 1/2005 | Kurapati | |
| 6,853,630 B1 | 2/2005 | Manning | |
| 6,854,014 B1 | 2/2005 | Amin et al. | |
| 6,888,821 B2 * | 5/2005 | Rasanen et al. | 370/352 |
| 6,973,309 B1 | 12/2005 | Rygula et al. | |
| 6,978,380 B1 | 12/2005 | Husain et al. | |

(Continued)

FOREIGN PATENT DOCUMENTS

EP    1414212    4/2004

(Continued)

OTHER PUBLICATIONS

<http://www.3gpp.org/ftp/Specs/html-info/24229.htm> printed on Dec. 5, 2009.

(Continued)

*Primary Examiner* — Salman Ahmed
*Assistant Examiner* — Peter Chau
(74) *Attorney, Agent, or Firm* — Wilmer Cutler Pickering Hale and Dorr LLP

(57) ABSTRACT

Systems and methods for providing dynamic changes to a packet flow in a communication network are described. The dynamic changes can include upgrading and downgrading quality of service (QoS), adapting the stream to a receiving device, modifying the stream to counter-act changes in an air interface, and modifying the stream to accommodate an inter-technology handover. These changes can be provided by inspecting packets at a gateway and setting up a proxy for multimedia stream packet flows. The proxy can coordinate transcoding to take place to change the stream. The gateway can also monitor conditions at the mobile node using a real time control protocol or other applicable protocols.

6 Claims, 10 Drawing Sheets

U.S. PATENT DOCUMENTS

| | | | |
|---|---|---|---|
| 7,454,206 | B1 | 11/2008 | Phillips et al. |
| 7,474,894 | B2 * | 1/2009 | Cardina et al. ............. 455/432.3 |
| 7,613,836 | B2 | 11/2009 | Tober et al. |
| 2002/0029260 | A1 | 3/2002 | Dobbins et al. |
| 2002/0131404 | A1 | 9/2002 | Mehta et al. |
| 2003/0016630 | A1 | 1/2003 | Vega-Garcia et al. |
| 2003/0050076 | A1 | 3/2003 | Watanabe |
| 2003/0058872 | A1 | 3/2003 | Berggreen et al. |
| 2003/0188012 | A1 | 10/2003 | Ford |
| 2003/0227880 | A1 | 12/2003 | Heller et al. |
| 2004/0006573 | A1 * | 1/2004 | Takashi ...................... 707/104.1 |
| 2004/0047290 | A1 | 3/2004 | Komandur et al. |
| 2004/0054929 | A1 | 3/2004 | Serpa |
| 2004/0068574 | A1 | 4/2004 | Costa Requena et al. |
| 2004/0109414 | A1 | 6/2004 | Choi et al. |
| 2004/0109459 | A1 | 6/2004 | Madour et al. |
| 2004/0111476 | A1 | 6/2004 | Trossen et al. |
| 2004/0122954 | A1 * | 6/2004 | Shaheen ...................... 709/227 |
| 2004/0122967 | A1 | 6/2004 | Bressler et al. |
| 2004/0137918 | A1 | 7/2004 | Varonen et al. |
| 2004/0139230 | A1 | 7/2004 | Kim |
| 2004/0224688 | A1 | 11/2004 | Fischer |
| 2005/0002381 | A1 | 1/2005 | Westman et al. |
| 2005/0005025 | A1 | 1/2005 | Harville et al. |
| 2005/0009520 | A1 | 1/2005 | Herrero et al. |
| 2005/0021713 | A1 | 1/2005 | Dugan et al. |
| 2005/0083974 | A1 | 4/2005 | Mayer et al. |
| 2005/0111450 | A1 | 5/2005 | Miyamoto et al. |
| 2005/0124341 | A1 | 6/2005 | Myllymaki et al. |
| 2005/0190740 | A1 | 9/2005 | Zhao et al. |
| 2005/0201357 | A1 | 9/2005 | Poyhonen |
| 2005/0204052 | A1 * | 9/2005 | Wang et al. .................... 709/231 |
| 2005/0233727 | A1 | 10/2005 | Poikselka et al. |
| 2006/0025132 | A1 * | 2/2006 | Karaoguz et al. ............. 455/433 |
| 2006/0031559 | A1 | 2/2006 | Sorokopud et al. |
| 2006/0046714 | A1 * | 3/2006 | Kalavade ...................... 455/428 |
| 2006/0058056 | A1 | 3/2006 | Das et al. |
| 2006/0067244 | A1 | 3/2006 | Sekaran et al. |
| 2006/0104431 | A1 | 5/2006 | Emery et al. |
| 2006/0146792 | A1 | 7/2006 | Ramachandran et al. |
| 2006/0155871 | A1 | 7/2006 | Ilkka et al. |
| 2006/0193295 | A1 | 8/2006 | White et al. |
| 2006/0211423 | A1 | 9/2006 | Ejzak et al. |
| 2006/0239255 | A1 | 10/2006 | Ramachandran et al. |
| 2006/0251050 | A1 | 11/2006 | Karlsson |
| 2006/0256751 | A1 | 11/2006 | Jagadeesan et al. |
| 2006/0256779 | A1 | 11/2006 | Lim et al. |
| 2006/0264213 | A1 | 11/2006 | Thompson |
| 2006/0270404 | A1 | 11/2006 | Tuohino et al. |
| 2007/0022199 | A1 | 1/2007 | Tatsubori |
| 2007/0025301 | A1 * | 2/2007 | Petersson et al. ............. 370/338 |
| 2007/0036078 | A1 | 2/2007 | Chowdhury et al. |
| 2007/0036079 | A1 | 2/2007 | Chowdury et al. |
| 2007/0041320 | A1 * | 2/2007 | Chen et al. .................... 370/235 |
| 2007/0058561 | A1 | 3/2007 | Virgile |
| 2007/0066286 | A1 * | 3/2007 | Hurtta ......................... 455/414.1 |
| 2007/0076729 | A1 | 4/2007 | Takeda |
| 2007/0082681 | A1 | 4/2007 | Kim et al. |
| 2007/0097967 | A1 | 5/2007 | Kauppinen et al. |
| 2007/0118656 | A1 * | 5/2007 | Anderson et al. ............. 709/227 |
| 2007/0156869 | A1 | 7/2007 | Galchev et al. |
| 2007/0206515 | A1 | 9/2007 | Andreasen et al. |
| 2007/0206617 | A1 | 9/2007 | Andreasen et al. |
| 2007/0209061 | A1 | 9/2007 | Dekeyzer et al. |
| 2007/0253371 | A1 | 11/2007 | Harper et al. |
| 2007/0254673 | A1 | 11/2007 | Stenberg et al. |
| 2008/0002592 | A1 | 1/2008 | Yegani et al. |
| 2008/0020775 | A1 | 1/2008 | Willars |
| 2008/0052387 | A1 | 2/2008 | Heinz et al. |
| 2008/0084867 | A1 | 4/2008 | Foti et al. |
| 2008/0095339 | A1 | 4/2008 | Elliott et al. |
| 2008/0130637 | A1 * | 6/2008 | Kant et al. ..................... 370/389 |
| 2008/0137541 | A1 | 6/2008 | Agarwal et al. |
| 2008/0219218 | A1 * | 9/2008 | Rydnell et al. ................ 370/331 |
| 2008/0233947 | A1 | 9/2008 | Herrero-Veron |
| 2008/0254768 | A1 | 10/2008 | Faccin |
| 2009/0054037 | A1 | 2/2009 | Kaippallimalil |
| 2009/0109845 | A1 | 4/2009 | Andreasen et al. |
| 2009/0285225 | A1 | 11/2009 | Dahod |

FOREIGN PATENT DOCUMENTS

| | | |
|---|---|---|
| WO | WO-01/22642 | 3/2001 |
| WO | WO-2007/081727 | 7/2007 |
| WO | WO-2009/067445 | 5/2009 |

OTHER PUBLICATIONS

<http://www.acmepacket.com/html/page.asp?PageID=%7bFB2657BA-EE7A-46C1-BEA8-F650C93BF5C3%7d> printed on Dec. 5, 2009.

International Search Report and Written Opinion issued for International Patent Application No. PCT/US2007/086802.

International Search Report and Written Opinion issued for International Patent Application No. PCT/US2007/086747.

International Search Report and Written Opinion for corresponding International Patent Application No. PCT/US2007/086884.

CT Labs Report, "SIP and RTP Denial of Service Attack Tests Summary Report", pp. 1-4, 2005.

http://www.3gpp.org, 3GPP TS 24.229 V6.12.0 (Sep. 2006), pp. 1-304, Oct. 3, 2006.

International Search Report and Written Opinion for PCT Application No. PCT/US07/86808 issued on Apr. 10, 2008.

International Search Report and Written Opinion for PCT Application No. PCT/US07/86886 mailed Apr. 10, 2008.

International Search Report and Written Opinion for PCT Application No. PCT/US2007/000132.

International Search Report and Written Opinion for PCT Application No. PCT/US2008/83911.

Partial International Search Report for PCT Application No. PCT/US2007/000132.

3GPP TS 23.401 v8.3.0 (Sep. 2008), 3rd Generation Partnership Project; Technical Specification Group Services and System Aspects; General Packet Radio Services (GPRS) enhancements for Evolved Univeral Terrestrial Radio Access Network (E-UTRAN) access (Release 8), http://www.3gpp.org (204 pages).

3GPP TS 29.274 v1.3.0 (Oct. 2008), 3rd Generation Partnership Project; Technical Specification Group Core Network and Terminals; 3GPP Evolved Packet System; Evolved GPRS Tunnelling Protocol for Control Plane (GTPv2-00; Stage 3 (Release 8); http://www.3gpp.org (1 page).

3GPP TS 36.413 v8.3.0 (Sep. 2008), 3rd Generation Partnership Project; Technical Specification Group Radio Access Network; Evolved Univeral Terrestrial Radio Access Network (E-UTRAN0; S1 Application Protocol (S1AP) (Release 8), http://www.3gpp.org (2 pages).

International Search Report and Written Opinion for corresponding International Patent Application No. PCT/US2009/043696 issued on Jun. 24, 2009 (5 pages).

International Search Report for International Application No. PCT/US09/64823 mailed Feb. 12, 2010 (1 page).

Nguyen-Vuong. "Mobility Management in 4G Wireless Heterogeneous Networks", PhD thesis. Jul. 2, 2008. www.biblio.univ.evry.fr/theses/2008/2008EVRY00007.pdf (171 pages).

Partial International Search Report issued for International Patent Application No. PCT/US2007/000132, (2 pages).

* cited by examiner

PROVIDING DYNAMIC CHANGES TO PACKET FLOWS

CROSS REFERENCE TO RELATED APPLICATION

This application claims benefit under 35 U.S.C. §119(e) of U.S. Provisional Patent Application No. 60/873,493, entitled "Apparatus and Method for Providing a Call Session Control Function," filed Dec. 7, 2006, which is hereby incorporated by reference herein in its entirety.

FIELD OF THE DISCLOSURE

This disclosure relates to a system and method for providing dynamic changes to packet flows in a communication network.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. A mobile node can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is setup, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the setup and teardown of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The packet flow may include a number of packets or a single packet. Services may be applied to a packet flow such as lawful interception (wire tapping), Virtual Private Networks (VPNs), and firewalls.

A part of the evolution of packet based communications has been the development of IP Multimedia Subsystem (IMS). IMS is an architectural framework for delivering internet protocol (IP) multimedia to mobile nodes. A call session control function (CSCF) can manage much of the signaling that occurs in an IMS core. The CSCF functionality can be logically divided into three functionalities: a Proxy-CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The $3^{rd}$ Generation Partnership Project (3GPP) is responsible for IMS which works with GSM systems and the $3^{rd}$ Generation Partnership Project 2 (3GPP2) is responsible for Multimedia Domain (MMD) which is used with CDMA systems and is based on the 3GPP IMS concept.

Another aspect gaining prominence is Quality of Service (QoS) as networks are looking to guarantee levels of service to a user for running applications such as VoIP, streaming media, gaming, etc. to a mobile node. QoS typically works by providing a certain level of bandwidth to a data flow at a certain point in the delivery process. This works well on wireline networks where the transmission of information is fairly constant. However, where the transmission medium is not as certain, QoS can fail to provide the actual level of service to the user depending on conditions such as interference or fading.

SUMMARY OF THE DISCLOSURE

Systems and methods for providing dynamic changes to packet flows in a communication network are disclosed. In some embodiments, adaptive quality of service (QoS) is provided to a multimedia session in real time, where the session can be monitored and managed to provide a better user experience. In certain embodiments, a gateway in a communication network includes a proxy instance residing in the gateway that inspects packets for information regarding setup of media streams, an inline service residing in the gateway that negotiates a session with a mobile node to set media stream parameters, monitors feedback received from the mobile node, and manages transcoding, and a digital signal processor (DSP) residing in the gateway that provides transcoding to a media stream.

In some embodiments, a method includes inspecting packets to detect a setup of a media stream to a mobile node, modifying setup messages to pass the media stream through an inline service, monitoring feedback received from the mobile node, and analyzing feedback to determine modifications to the media stream and managing a digital signal processing (DSP) engine.

DETAILED DESCRIPTION

Systems and methods for dynamic application of changes to a media stream in a communication network are disclosed in some embodiments. A gateway may be used to implement the quality of service on packet flows for IP multimedia subsystem (IMS) and multimedia domain (MMD) architectures. QoS enforcement and the dynamic application of QoS can be provided by a combination of hardware and software. Residing within the gateway can be one or more network processing units, line cards, as well as packet and voice processing cards. QoS typically works by providing a certain level of bandwidth to a data flow at a certain point in the delivery process. For example, guaranteeing a certain bandwidth at a packet data serving node (PDSN) or similar networking equipment. The problem with QoS using this approach is that the actual bandwidth achieved over the airlink to the mobile node is not a factor. If there is interference or drops in signal strength because of the distance to the radio access network, the QoS is not adjusted because there is no feedback. The QoS mechanisms provided by the standards are static. In certain embodiments, QoS is dynamically provided in IMS and MMS topologies through the use of feedback.

Figure 1:
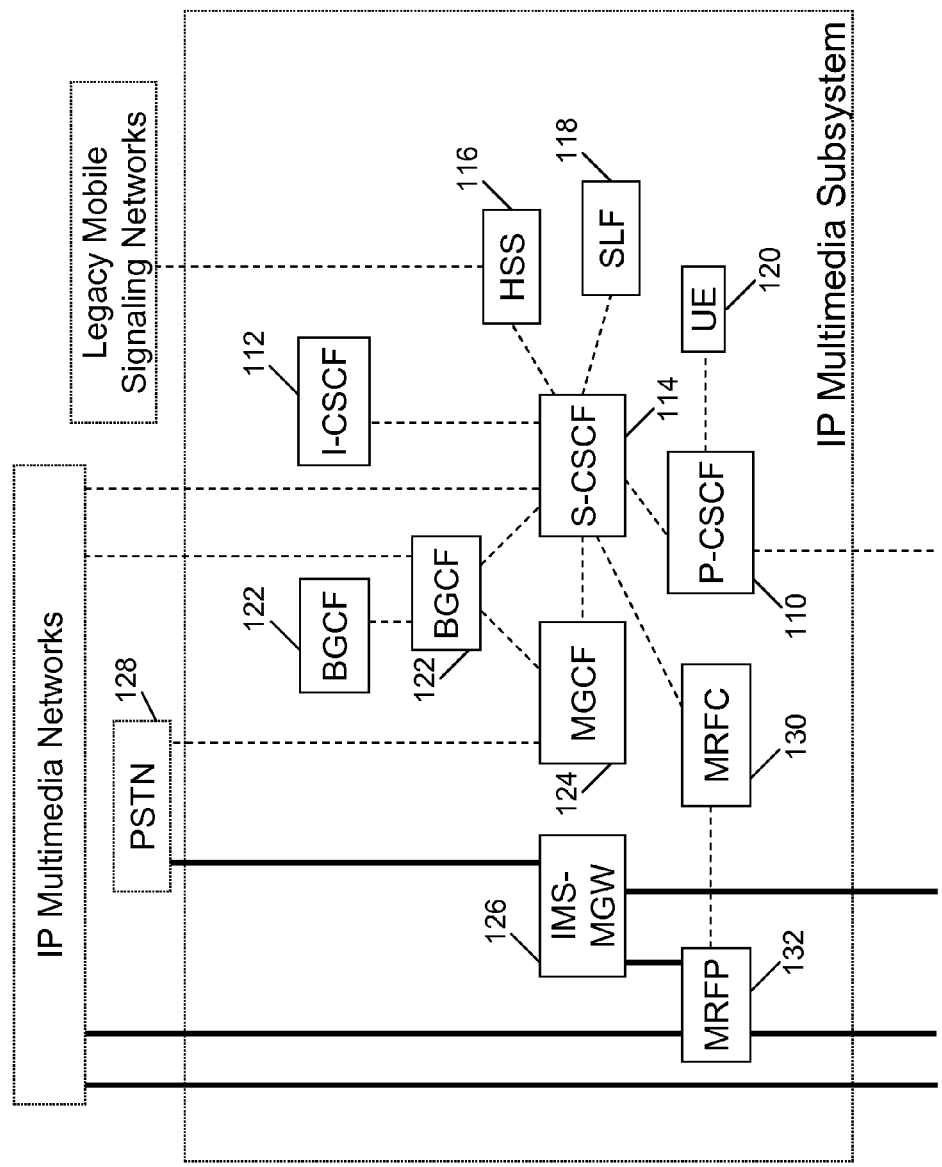
FIG. 1 is a block diagram illustrating an IP multimedia subsystem (IMS) architecture in accordance with certain embodiments.

FIG. 1 illustrates an IP multimedia subsystem (IMS) where logical components of a network setup are shown in accordance with some embodiments. FIG. 1 includes a P-CSCF 110, an I-CSCF 112, a S-CSCF 114, a Home Subscriber Server (HSS) 116, a Subscriber Location Function (SLF) 118, User Equipment (UE) 120, Breakout Gateway Control Function (BGCF) 122, Media Gateway Control Function (MGCF) 124, Media Gateway (MGW) 126, Public Switched Telephone Network (PSTN) 128, Multimedia Resource Controller (MRFC) 130, and Multimedia Resource Function Processor (MRFP) 132. HSS 116 is a master user database that supports the S-CSCF or other network entities that handle calls and sessions. HSS 116 stores subscription-related information such as user profiles, performs user authentication and authorization, and can provide information about the physical location of the user. When multiple HSSs are used in a network a SLF 118 can be used to direct the queries to HSS 116 storing the information. Legacy signaling networks may also use the HSS for services. MRFC 130 communicates with S-CSCF 114 and controls the MRFP 132 to implement media related functions. The combination of MRFC 130 and MRFP 132 provides a source of media in the home network. BGCF 122 is a server that can route based on telephone number and is used when calling to a phone on the circuit switched network. MGCF 124 and MGW 126 are used to convert signaling from IMS to that which is appropriate for PSTN 128 circuit switched networks. The IP Multimedia Subsystem network can include application servers and other network entities that provide services to user equipment (or mobile node) 120.

Figure 2:
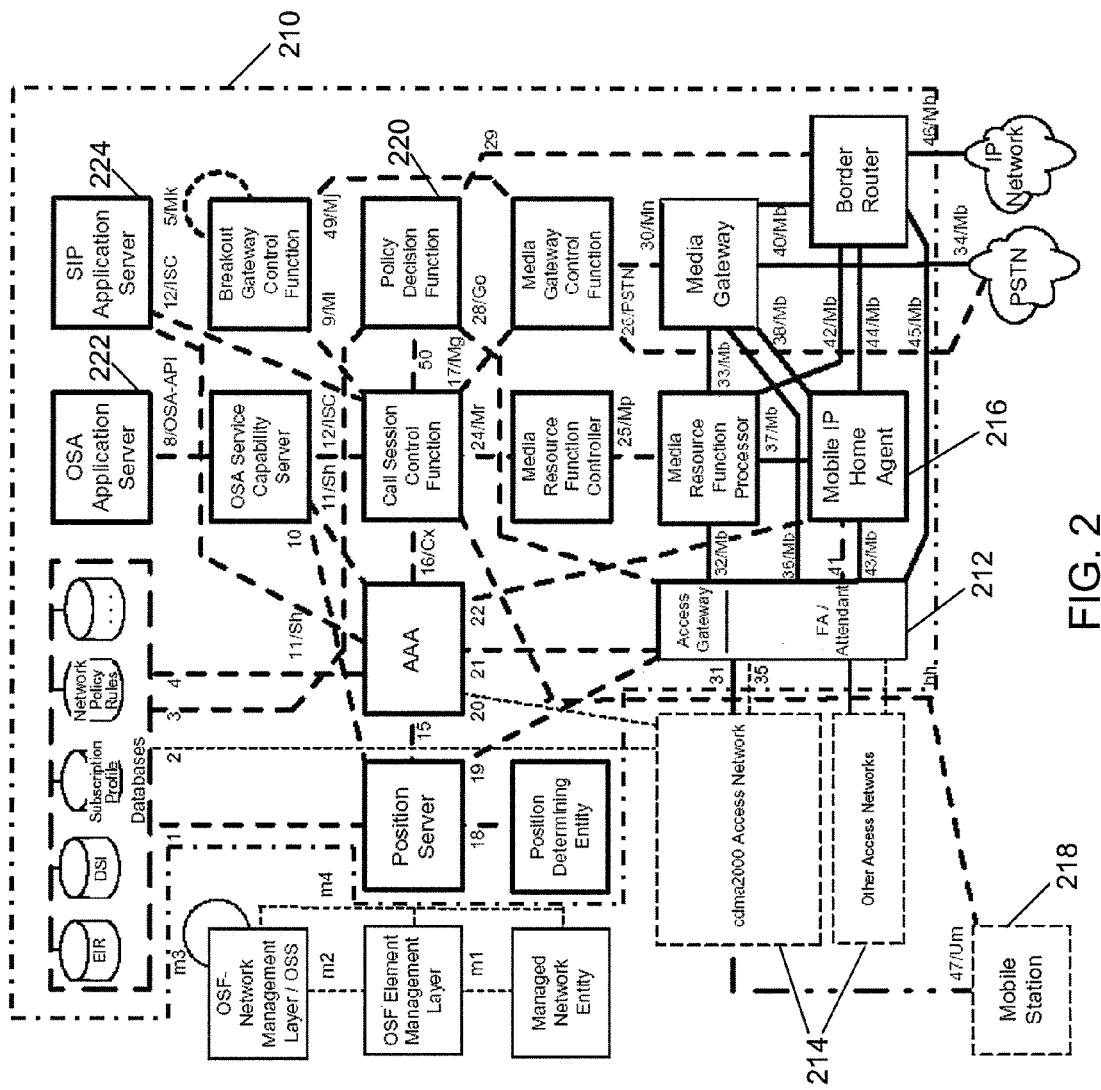
FIG. 2 is a block diagram illustrating a multimedia domain (MMD) architecture in accordance with certain embodiments.

FIG. 2 illustrates a Multimedia Domain (MMD) system 210 within a larger network. The MMD system 210 includes many of the same functions as the IMS system of FIG. 1, but further includes an access gateway/foreign agent 212 to communicate with access networks 214, as well as a home agent 216 to provide Mobile IP support to mobile stations 218 (or mobile node). A policy decision function (PDF), which can be included in a IMS or MMD network stores policies governing a user's session. Application servers such as an open systems architecture (OSA) application server 222 and SIP application server 224 provide applications such as location based services, video, email, chat, gaming, and other data and multimedia content.

As shown in FIGS. 1 and 2 a number of functions can be included in IMS and MMD topologies. Several of these functions are used in providing, for example, voice over IP (VoIP) routing and enhanced services, such as enhanced charging, stateful firewalls, traffic performance optimization (TPO). In some embodiments, one or more of these functions can be provided by a single entity in the network such as a gateway. The IMS and MMS topologies also allow provision of applications such as VoIP, streaming video, streaming music, multi-user gaming, location based services, and a variety of content delivered to a mobile node.

Figure 3:
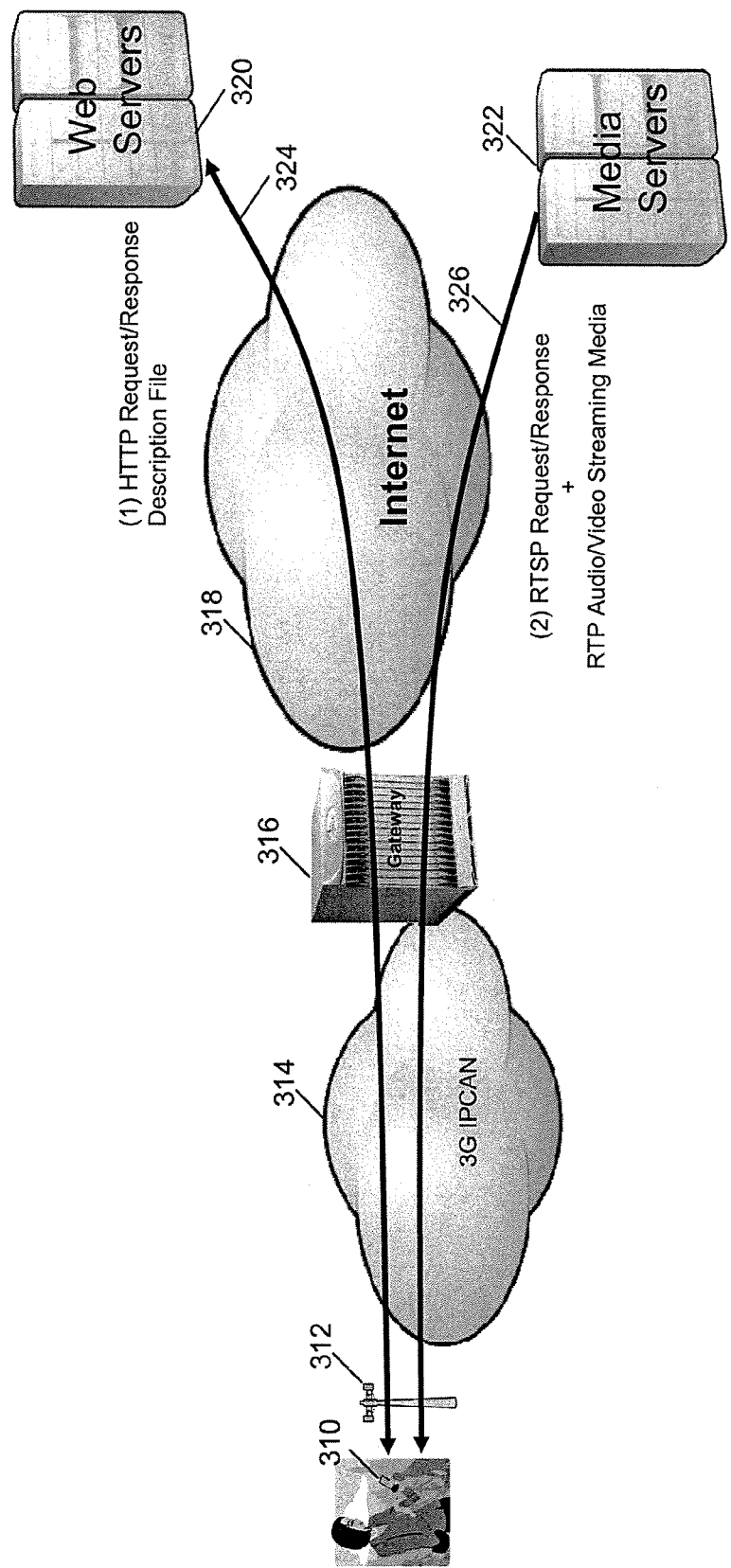
FIG. 3 is a block diagram illustrating delivery of streaming media to a mobile node in accordance with certain embodiments.

FIG. 3 illustrates a delivery of streaming media to a mobile node in accordance with certain embodiments. FIG. 3 includes a mobile node 310, a radio access network (RAN), an IP carrier access network (IPCAN) 314, an access gateway 316, Internet 318, web servers 320, and media servers 322. Access gateway 316 can be a packet data serving node (PDSN), a gateway GPRS support node (GGSN), or any other applicable network equipment. A user can request content on their mobile node 310 with a HTTP request description message 324. Web servers 320 can respond with a message 324 that identifies to mobile node 310 where the content can be located. Mobile node 310 can then send a real-time streaming protocol (RTSP) request 326 to media servers 322. Media servers can provide mobile node 310 with a response and real-time transport protocol streaming media 326.

Figure 4:
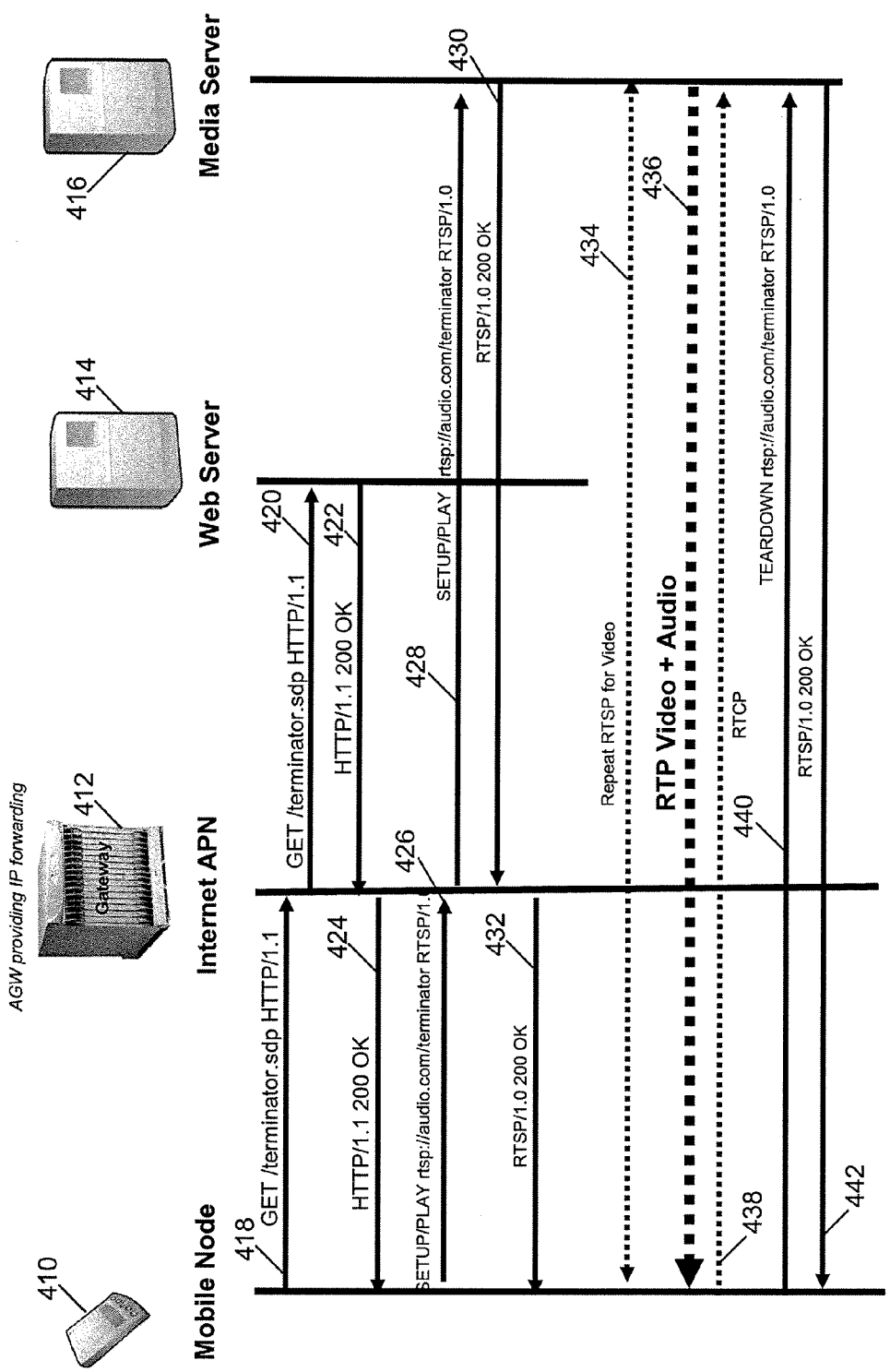
FIG. 4 is a signaling flow illustrating setup and teardown of a media stream in accordance with certain embodiments.

FIG. 4 illustrates a signaling diagram of communication involved in providing streaming media in accordance with certain embodiments. FIG. 4 includes a mobile node 410, an Internet access point name (APN) 412, web server 414, and media server 416. Internet APN is an internet server such as a virtual private network (VPN), for example. Mobile node 410 sends a get message 418 to Internet APN 412 to get content specified by the user. Internet APN 412 forwards get message 420 to the appropriate web server 414. Web server 414 sends a HTTP 200 OK message 422. Message 422 can include real time streaming protocol (RTSP) information in the message body. An example of information message 422 can include is:

v =0 o =-2890 2890842807 IN IP4 192.16.24.202 s =RTSP Session m =audio 0 RTP/AVP 0 a =control:rtsp://audio.com/terminator/audio.en m =video 0 RTP/AVP 31 a =control:rtsp://video.com/terminator/video

Internet APN 412 receives message 422 and forwards message 424 on to mobile node 410.

In RTSP message 426, a setup and a play request is made regarding the desired content. Internet APN forwards message 428 on to the appropriate media server 416 to fulfill the setup and play request message 426. Media server 416 sends a RSTP 200 OK message 430. Internet APN receives message 430 and forwards message 432 to the appropriate mobile node 410. In 434, the same type of messaging is performed to retrieve the video content from media server 416. Media server 416 begins sending RTP video and audio to mobile node 410 with packet flow 436. Real time control protocol (RTCP) messaging 438 can be used to provide out of band control information regarding the RTP packet flow and provide QoS feedback. The RTCP messaging 438 can be monitored by Internet APN, which is an access gateway, to obtain feedback on the QoS levels at mobile node 410. Depending on the QoS level obtained by RTCP messaging 438, Internet APN can send messages to media server to upgrade or downgrade the QoS of the media stream.

If the mobile node is receiving a quality of service of 100 kbps, when the mobile node is being sent 250 kbps, the Internet APN 412 can upgrade the QoS to 500 kbps, for example, in order to overcome air interface interferences. The Internet APN 412 can also perform transcoding on the media stream depending on the QoS feedback received in the RTCP messages. The transcoding can involve adding redundancy, interleaving, or possibly error correcting codes depending on the mobile node. Internet APN 412 in some embodiments can increase the bandwidth allocated to the mobile node and use the additional bandwidth to transcode the streaming media received from media server 416. The transcoding can also involve changing the format of the streaming media. At some point mobile node 410 sends a teardown message 440, and the session is torndown with a response message 442 sent by media server 416.

The streaming media can be defined by a number of parameters such as resolution, codecs, and frame rate. Resolution for video is bits horizontal by bits vertical (e.g., for a mobile node quarter common intermediate format (QCIF) might be used). The audio codec can be telephony quality about 8 kbps using an AMR NB (adaptive multi-rate narrow band) or mp3/cd quality around 96 kbps using an AAC WB (advanced audio coding wide band). The frame rate for video can be, for example, movie quality (30 fps) or video telephony quality (5 fps). The I-Frame (intraframe) rate for video can compress video by using one or more reference frames and delta frames. The delta frames include the changes from the reference frame, rather than sending the information for each frame. The video codec can be inter frame and/or intra frame using, for example, H 26x to provide video telephony quality at around 100 kbps or MPEG-x to provide movie quality at around 512 kbps. The transcoding feature in the gateway can be used to change the codec, frame rate, and other parameters to provide QoS levels that are consistent with what the subscriber expects on the mobile node. The media parameter selection leads to a target bitrate, which is dynamic in certain embodiments, to adjust QoS.

A number of different media containers can be used to transport the streaming media. A media container includes data that is formatted for a particular audio/video codec. In some embodiments, the transcoder can switch between containers such as 3GP, MPEG-x, AVI, MOV, WAV, Realmedia, AIFF, XMF, IFF, ASF, DVR-MS, Ogg, OGM, NUT, MXF, ratDVD, SVI, VOB, DIVX, and any other applicable media containers. The gateway can also provide access to content that would not otherwise be accessible to the mobile node. This can occur because a content server keeps content in a few known formats and it can be difficult to provide the same content to both wireless and wireline subscribers because the characteristics of the two are different. For example, there is low bandwidth low packet loss xDSL access networks, while similar bandwidth for general packet radio service (GPRS) and 1x wireless networks are high packet loss. Additionally, high bandwidth wireline networks (e.g., cable and fiber) have low packet loss while wireless networks (e.g., 3G, WiMAX, and WiFi) have high packet loss.

Further, access devices differ in terms of audio and video capabilities. For example, desktop monitors can be running at 1280×720 resolution, while mobile nodes run at 176×144 or 352×288. The gateway can tailor content to the device attaching to the network through on the fly transcoding in some embodiments. For a 3G mobile device, the gateway can downgrade the resolution while changing the format and data rate to ensure a desired QoS despite the interference and packet loss associated with the air interface.

Figure 5:
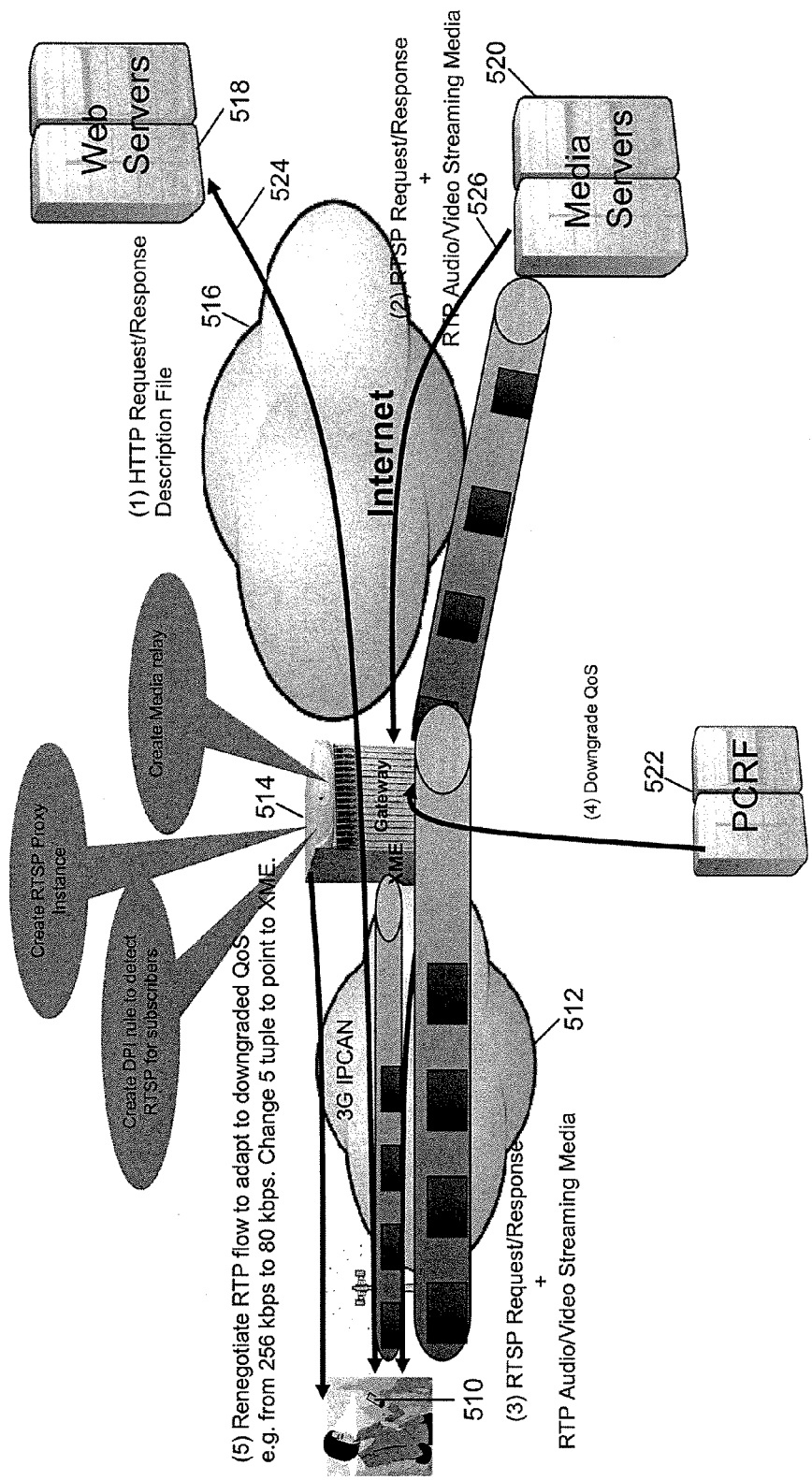
FIG. 5 is a block diagram illustrating provision of dynamic management of a media stream in accordance with certain embodiments.

FIG. 5 illustrates providing dynamic quality of service adjustments at an access gateway in accordance with certain embodiments. FIG. 5 includes a mobile node 510, a 3G internet protocol carrier access network (IPCAN) 512, gateway 514, Internet 516, web servers 518, media servers 520, and policy and charging rules function (PCRF) 522. Gateway 514 can utilize deep packet inspection to detect RTSP and create a RTSP back-to-back user agent (B2BUA) instance for the session at the gateway. A RTSP B2BUA can allow the transcoding and provision of other services between call legs on either side of gateway 514. Mobile node 510 can still begin a session by communicating HTTP messaging 524 with web servers 518. Gateway 514 can detect RTSP request/response messaging 526 between mobile node 510 and media servers 520 by inspecting packets.

In some embodiments, gateway sets up a B2BUA instance that can setup a call leg with mobile node 510 and setup a second call leg with media servers 520. Gateway 514 can also create one or more RTSP proxy instances. The proxy instances can be setup when deep packet inspection detects a request for content. Gateway 514 can setup the proxy instances to negotiate delivery of the content from media servers 520 and delivery of the content from gateway 514 to mobile node 510. With gateway 514 in the middle of the streaming media session, the gateway can control the media stream, re-negotiate the provision or parameters of the stream, and can perform processing such as transcoding on the stream. In some embodiments, RTSP can be used to setup the media stream and RTP can be used to deliver the content. The gateway can also relay the media stream without modifying the stream. Even if the media stream is relayed on to mobile node 510, gateway 514 can introduce transcoding or other services on a per session basis. The gateway can also receive instructions on how and/or when to change the media stream. These instructions can come from PCRF 522. For example, in FIG. 5, PCRF 522 downgrades the QoS to mobile node 510. Gateway 514 re-negotiates the RTP flow to adapt to the downgraded QoS. This can be, for example, a downgrading of 256 kbps to 80 kbps. This is accomplished by changing the flow from being relayed to pass through a digital signal processing (DSP) card in the gateway in some embodiments. The DSP card can include a DSP engine provides transcoding.

The gateway can also provide a streaming media proxy function, for example, when the desired content is stored in a format that may not be compatible or readily available for sending over the air interface to the mobile node. This can occur if the airlink provided to mobile node 510 does not have the bandwidth to stream the content in its original format. In other embodiments, mobile node 510 sets up the session with media servers 520 and the gateway relays the packets, while inspecting the feedback until a change is implemented. The gateway can later redirect the session internally to transcode the stream or provide other services to the stream.

Figure 6:
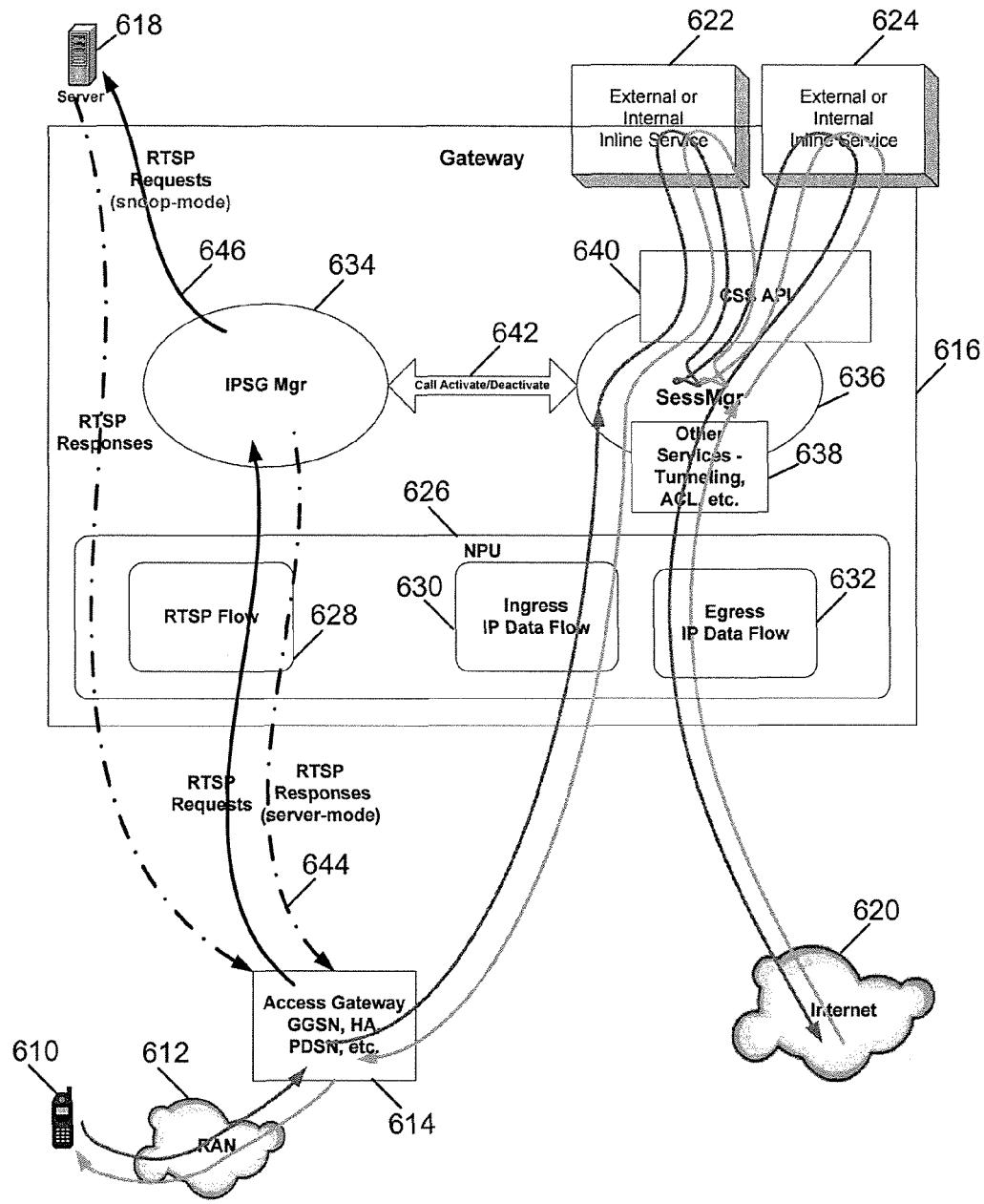
FIG. 6 is a block diagram illustrating mechanisms within a gateway for providing dynamic management of a media stream in accordance with certain embodiments.

FIG. 6 illustrates packet flows through a gateway in accordance with some embodiments. FIG. 6 includes a mobile node 610, a radio access network (RAN) 612, an access gateway 614, a gateway 616, a server 618, an internet 620, and an external or internal in-line service 622 and 624. Access gateway 614 and gateway 616 can be the same gateway in certain embodiments. Gateway 616 includes network processing unit (NPU) 626, RTSP flow 628, ingress IP data flow 630, egress IP data flow 632, IPSG manager 634, session manager 636, other services module 638, content service steering (CSS) application program interface (API) 640, and module communication 642. RTSP flow 628, Ingress IP data flow 630, Egress IP data flow 632, IPSG manager 634 and session manager 636 can be implemented in software and can be used to provide the services to a packet flow. RTSP flow 628 can be used by IPSG manager 634 to monitor RTSP messaging destined to a media server 618. The flow can monitor messages by checking messages for certain information and if message meets certain criteria sending the message to the IPSG manager or another module for deep packet inspection, in certain embodiments.

The RTSP requests are received by the IPSG manager 634 for processing. The IPSG manager 634 inspects the messages to activate and deactivate sessions in gateway 616. During the inspection of the messages by IPSG manager 634, information is also obtained that can be used to setup the session, authenticate the session, and link the session to a subscriber profile. This information can be sent to session manager 636 through module communication 642, which may be implemented in any combination of hardware or software. IPSG manager 634 can setup one or more RTSP flows 628 corresponding to the port numbers used by the access gateway 614 when communicating to a media server 618.

IPSG manager 634 can function in at least two modes relating to the handling of RTSP messages received from access equipment. In some embodiments, IPSG manager 634 is in a server mode. In server mode, the RTSP messages are addressed to gateway 616 and IPSG manager 634 issues RTSP responses 644, with gateway 616 implementing a B2BUA or a proxy media server. In other embodiments, IPSG manager 634 is in an inspect mode and the messages are not addressed to the gateway, so the messages are directed to the IPSG manager 634 by NPU 626. At IPSG manager 634, the messages are inspected and information is extracted before the message is forwarded 646. In both modes, the messages are inspected and information is extracted and sent to session manager 636. IPSG manager 634 can inspect RTSP setup and teardown messages to activate and deactivate sessions by way of communication module 642. An internal inline service, such as inline service 622, can be used to monitor RTCP packets and determine how to modify the media stream. The modifications can be provided by a DSP engine on a DSP card.

Session manager 636 can create at least one IP data flow, which can include IP data flows 630 and 632. Egress IP data flow 632 is the more likely to be implemented for streaming media because the stream is provided via a downlink. However, both IP flows can be used when a user is engaged in video telephony or gaming on the mobile node because both an uplink and downlink are used. Ingress IP data flow 630 indicates to session manager 636 that the packet is coming from mobile node 610 so that session manager 636 can relay the packet or provide services such as transcoding. When a packet arrives at egress IP data flow 632, a similar process takes place. Egress IP data flow 632, like ingress IP data flow 630, recognizes packets on a subscriber session basis and forwards the packets to session manager 636 for relaying or providing services such as transcoding. When a new session is activated and session manager 636 receives the extracted information from IPSG manager 634, session manager 636 can authenticate the call to load the subscriber profile, in certain embodiments. The authentication can involve the NAI, the MSID, the user name and password, or any other authentication attribute of mobile node 610. The subscriber profile includes configuration information such as the subscriber access control list (ACL), the corresponding CSS redirections, and other services applied for this subscriber. When the call is authenticated or authorized, then the dynamic QoS on a per-session basis is setup and data flow begins. The session manager may also authenticate the subscriber with a PCRF so the PCRF can send instructions regarding QoS.

CSS API 640 is a module that defines how packet flows are handled by the gateway based on the content of the packets, which includes information in a packet header. The content service steering (CSS) API 640 includes features such as load balancing, network address translation (NAT), HTTP redirection, and DNS redirection. In some embodiments, the CSS API 640 uses information obtained from the subscriber profile to both select appropriate content service providers (e.g., the in-line service or external content server) and route the packet flows in a load balanced fashion. The load balancing can be accomplished by a number of algorithms such as round robin, least loaded, destination hashing, and normalized response time monitoring. The CSS API 640 can also monitor the health of external servers through internet control message protocol (ICMP), hypertext transfer protocol (HTTP), transfer control protocol (TCP), and file transfer protocol (FTP) keepalive mechanisms. By monitoring the health of external servers, the CSS API 640 can redirect packet flows if an external server fails. The CSS API 640 can also implement transcoding by redirecting media stream to an DSP card for processing. The CSS API 640 can direct the media stream packet flow to an enhanced charging service (ECS) in conjunction with dynamic quality of service.

Figure 7:
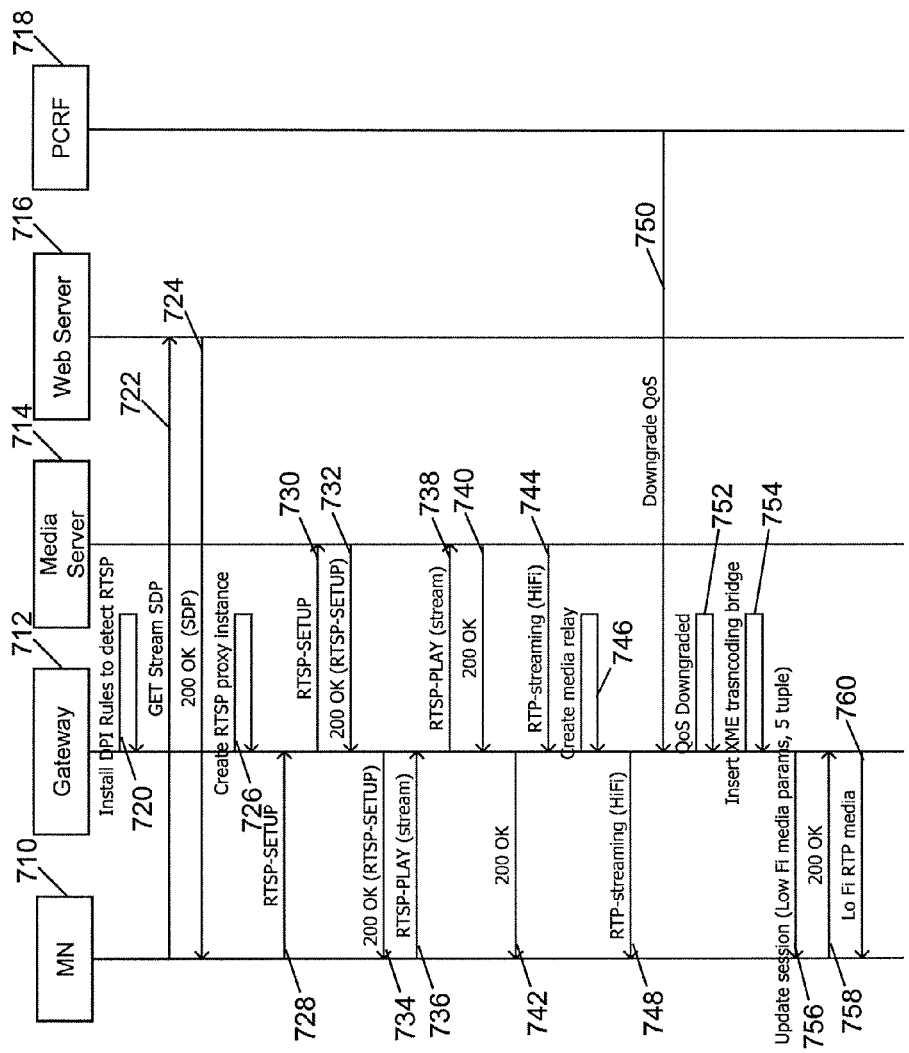
FIG. 7 is a signaling flow illustrating dynamic management of a media stream in accordance with certain embodiments.

FIG. 7 illustrates signaling in a network supporting dynamic application of QoS in accordance with certain embodiments. FIG. 7 includes a mobile node (MN) 710, a gateway 712, a media server 714, a web server 716, and a policy and charging rules function (PCRF) 718. At 720, deep packet inspection (DPI) rules are installed on gateway 712 to detect real-time streaming protocol (RTSP). Mobile node sends a get message 722 to web server 716. Web server 716 sends a response message 724 to provide the mobile node 710 with information to retrieve the content. Gateway creates a RTSP proxy instance at 726. In other embodiments, a proxy instance can be created for other streaming protocols. Mobile node sends a RTSP setup message 728, which is received by gateway 712. Gateway sends a RTSP setup message 730 to media server 714. A proxy instance residing in gateway 712 can modify RTSP setup message 728 to create RTSP setup message 730. Media server 714 sends a response message 732, which is received by gateway 712. Gateway 712 may modify message 732 before sending response message 734 to mobile node 710. Message 732 may be modified to provide for interception by the RTSP proxy instance setup in the gateway.

Mobile node 710 sends an RTSP play message 736 to gateway 712. Gateway may modify RTSP play message 736 before sending a RTSP play message 738 to media server 714. A response message 740 is sent to gateway 712, which may modify the message before sending response message 742 to mobile node 710. Media server 714 begins RTP streaming in high fidelity (HiFi) with packet flow 744. Gateway 712 creates a media relay 746 to pass the packet flow along to mobile node 710. The media relay can route the packet flow along to mobile node without changing the underlying content, but may change information in the packet headers or encapsulate the packets depending on the embodiment. The RTP streaming packet flow 748 is sent to mobile node 710. PCRF 718 sends instructions 750 to downgrade the QoS of the RTP stream. Gateway 712 downgrades the QoS at 752 and inserts a transcoding bridge at 754. The transcoding bridge can be an internal rerouting of the packet flow to a digital signal processor (DSP) for transcoding processing before the stream is sent to mobile node 710. In some embodiments, the transcoding bridge can be implemented by the session manager in conjunction with CSS API steering the packet flow to the transcoding bridge. Gateway 712 sends an update session message 756 to mobile node 710. Update session message 756 can include low fidelity media parameters and other information. Mobile node 710 acknowledges the update with message 758. Gateway begins sending low fidelity media packet flow 760. Upgrading the QoS can occur in a similar fashion.

Relating to FIG. 7 a sample message flow is provided as an example of how some embodiments are implemented. At 720, deep packet inspection (DPI) rules are activated or installed to detect content streams. With message 722, mobile node 710 sends via gateway 712 to web server 716 a get message; an example is shown below:
GET /terminator.sdp HTTP/1.1
Host: www.example.com
Accept: application/sdp With message 724, web server 716 sends via gateway 712 a 200 OK message; an example is shown below:
HTTP/1.1 200 OK
Content-Type: application/sdp
v=0
o=-2890844526 2890842807 IN IP4 192.16.24.202
s=RTSP Session
m=audio 0 RTP/AVP 0
a=control:rtsp://mediaserver.com/terminator/audio.en
m=video 0 RTP/AVP 31
a=control:rtsp://mediaserver.com/terminator/video Gateway 712 can detect the RTSP packet flow and create a RTSP proxy as well as content steer. As part of the RTSP proxy, message 724 can be modified so mobile node sends messages directly to gateway 712; an example of message 724 is shown below:
HTTP/1.1 200 OK
Content-Type: application/sdp
v=0
o=-2890844526 2890842807 IN IP4 192.16.24.202
s=RTSP Session
m=audio 0 RTP/AVP 0
a=control:rtsp:H/ST16.inline.rtsp-service.com/terminator/audio.en
m=video 0 RTP/AVP 31
a=control:rtsp://ST16.inline.rtsp-service.com/terminator/video As shown in the example messages above, gateway can modify information regarding the content from web server 716 while leaving the content unchanged.

In order to setup a multimedia stream, mobile node 710 sends a RTSP setup message 728; an example of message 728 is shown below:
SETUP rtsp://ST16.inline.rtsp-service.com/terminator/audio.en RTSP/1.0
CSeq: 1
Transport: RTP/AVP/UDP;unicast
client_port-3056-3057

Gateway can modify message 728 and sends message 730 to media server 714; an example of message 730 is shown below:
SETUP rtsp://mediaserver.com/terminator/audio.en RTSP/1.0
CSeq: 1
Transport: RTP/AVP/UDP;unicast
;client_port=3056-3057

Media server 714 sends a message 732 to gateway an example of which is shown below:
RTSP/1.0 200 OK
CSeq: 1
Session: 12345678
Transport: RTP/AVP/UDP;unicast
;client_port=3056-3057;
;server_port=5000-5001

Gateway may modify message 732 before sending to mobile node 710, or may send message 734 an example of which is shown below:
RTSP/1.0 200 OK
CSeq: 1
Session: 12345678
Transport: RTP/AVP/UDP;unicast
;client_port=3056-3057;
;server_port=5000-5001

The setup messaging for a video stream can occur in a similar fashion.

In getting ready to play or start a multimedia stream, mobile node 710 sends a RTSP play message 736 for video to gateway 712; an example of message 736 is shown below:
PLAY rtsp://st16.inline.rtsp-service.com/terminator/video RTSP/1.0
CSeq: 2
Session: 23456789
Range: smpte=0:10:00-

Gateway can modify message 736 before sending message 738; an example of message 738 is shown below:
PLAY rtsp://mediaserver.com/terminator/video RTSP/1.0
CSeq: 2
Session: 23456789
Range: smpte=0:10:00-

Media server 714 can respond to gateway with message 740 as shown below for example:
RTSP/1.0 200 OK
CSeq: 2
Session: 23456789
Range: smpte=0:10:00-0:20:00
RTP-Info: url=rtsp://mediaserver.com/terminator/video
;seq=12312232;rtptime=78712811

Gateway can modify message 740 and send message 742 to mobile node 710; an example of message 742 is shown below:
RTSP/1.0 200 OK
CSeq: 2
Session: 23456789
Range: smpte=0:10:00-0:20:00
RTP-Info: url=rtsp://st16.inline.itsp-service.com/terminator/video
;seq=12312232;rtptime=78712811

The start or play messaging for an audio stream can occur in a similar fashion. As described above, the proxy instance can detect the setup of a media stream, modify the messages received to pass the media stream through an inline service, and set up the inline service to manage the media stream.

The PCRF can send messages to gateway to change the QoS for a session. The changes can include an upgrade in QoS, a downgrade in QoS, or a change in the format of the content. The changes can also be triggered internally within the gateway from feedback obtained from mobile node 710. A message from PCRF 718 can include instructions to (downgrade QoS from 512 kbps to 80 kbps for the audio and video RTP flows). These instructions can be received at a policy and charging enforcement function (PCEF), which can communicate the instructions to the proxy instance. The proxy instance can allocate a DSP transcoder to, for example, transcode from: CIF, 24 fps, mpeg-2, AAC audio; to: QCIF, 5 fps, H.264, AMR-NB. Information gathering on mobile node capabilities can be static or dynamic depending on the embodiment. In a static embodiment, the information can be obtained from a Ut interface, which is set forth by the open mobile alliance (OMA). In a dynamic embodiment, client capabilities can be obtained in real time by querying client capabilities using RTSP options.

Renegotiation between the mobile node and the gateway to change the media stream can include sending a session description protocol (SDP) message with the new media parameters, sending the new RTP sources ports pointing to the XME card with the DSP handling the transcoding, and sending a RTCP destination port pointing to the XME card. Gateway can send a pause RTSP message, renegotiate the session, and then send a RTSP play message. The gateway can monitor RTCP flows or other feedback signals to obtain information about the media stream reaching the mobile node. Adjustments to the streaming packet flow can be invoked independent of QoS upgrades or downgrades. These adjustments can be to enhance the user experience when the user encounters radio issues like fading, high bit error rate (BER), and cell boundaries for example. In some embodiments, a hysteresis is used to avoid thrashing. The hysteresis can be implemented by calculating a weighted average of feedback metrics and periodically comparing the weighted average to a threshold, for example.

Figure 8:
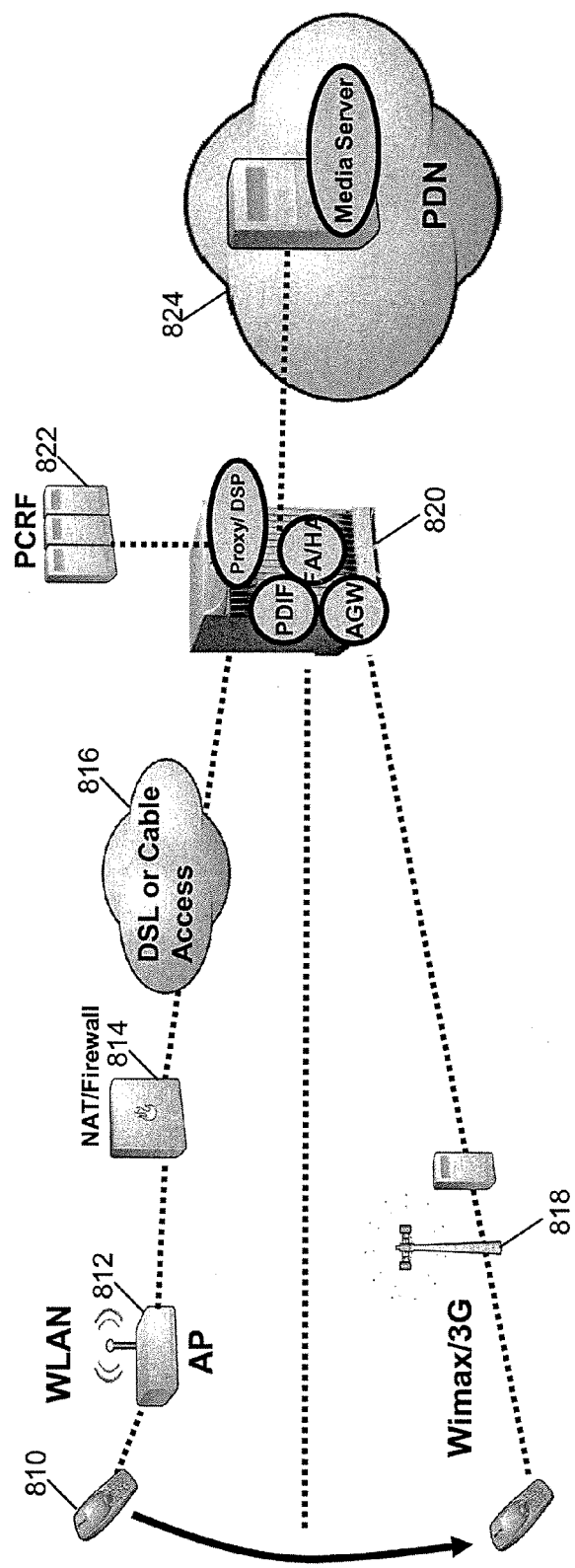
FIG. 8 is a block diagram illustrating dynamic management of a media stream across access networks in accordance with certain embodiments.

FIG. 8 illustrates a handover between access technologies where the air interface constraints change in accordance with certain embodiments. FIG. 8 includes a mobile node 810, an access point 812, a network address translator (NAT)/firewall 814, a service provider network 816, a WiMAX/3G radio access network (RAN) 818, gateway 820, a PCRF 822, and a packet data network (PDN) that includes a media server. Gateway 820 includes a packet data interworking function (PDIF), a foreign agent/home agent (FA/HA), an access gateway, and a proxy instance. This can be used, for example, where a user is watching a movie on a laptop on a WiFi connection. The connection can provide the laptop a high data rate for the movie. However, if the user leaves the WiFi connection and roams to the macro cellular environment, for example, high rate packet data (HRPD) or WiMAX, the connection will support a lesser data rate. The gateway can monitor the subscriber session and modify the session to provide the user an acceptable service level to enable the user to continue watching the movie.

Figure 9:
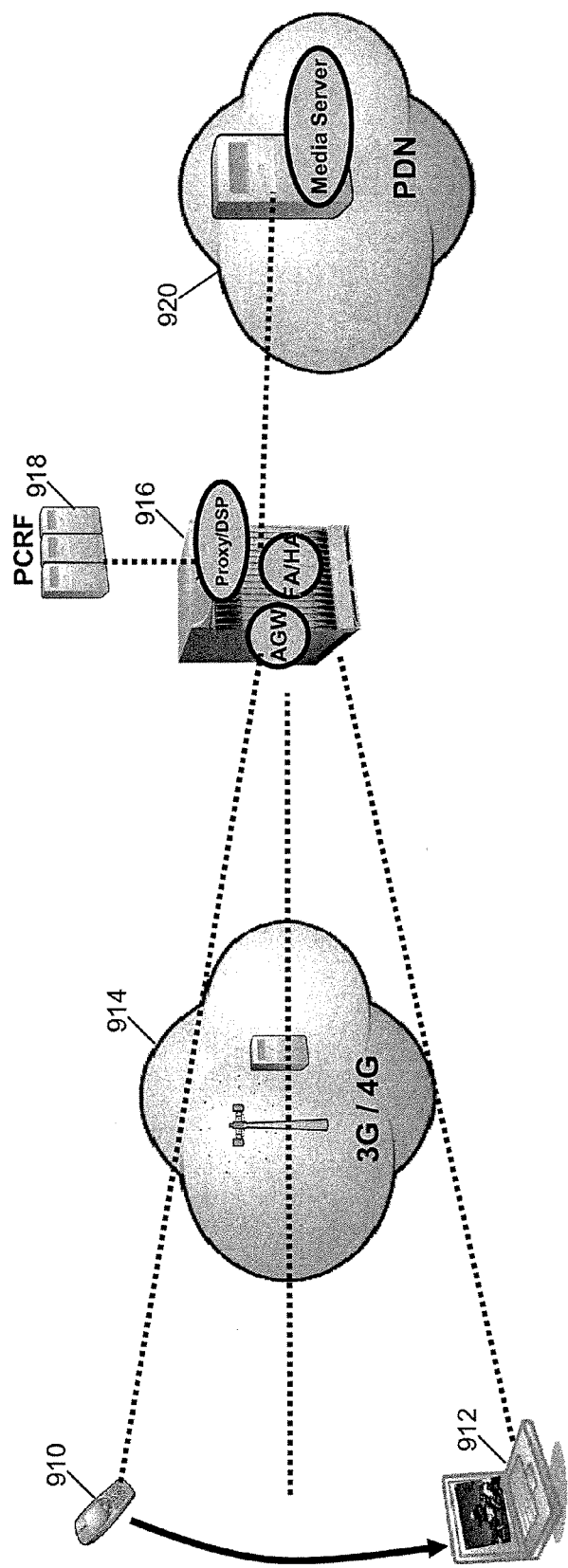
FIG. 9 is block diagram illustrating dynamic management of a media stream during a device handover in accordance with certain embodiments.

FIG. 9 illustrates a device handover where the device requirements can change in accordance with certain embodiments. FIG. 9 includes a mobile node 810, a mobile node 812, a 3G/4G network 814, gateway 816, a PCRF 818, and a packet data network 820. This type of handover can occur, for example, if a user moves a SIM card from one device to another or if user level registration occurs. User level registration is when a subscriber's identity is tied to registering a user name and password rather than using a SIM card or other hardware to identify a user. The benefit to the user is mobility of service. For example, a user can continue a session on their laptop from a PDA. Gateway 816 can monitor device handovers and adapt the content to the new device characteristics and the air interface. For example, when changing from a PDA to a laptop, the resolution of a movie can be changed to accommodate the bigger screen.

Figure 10:
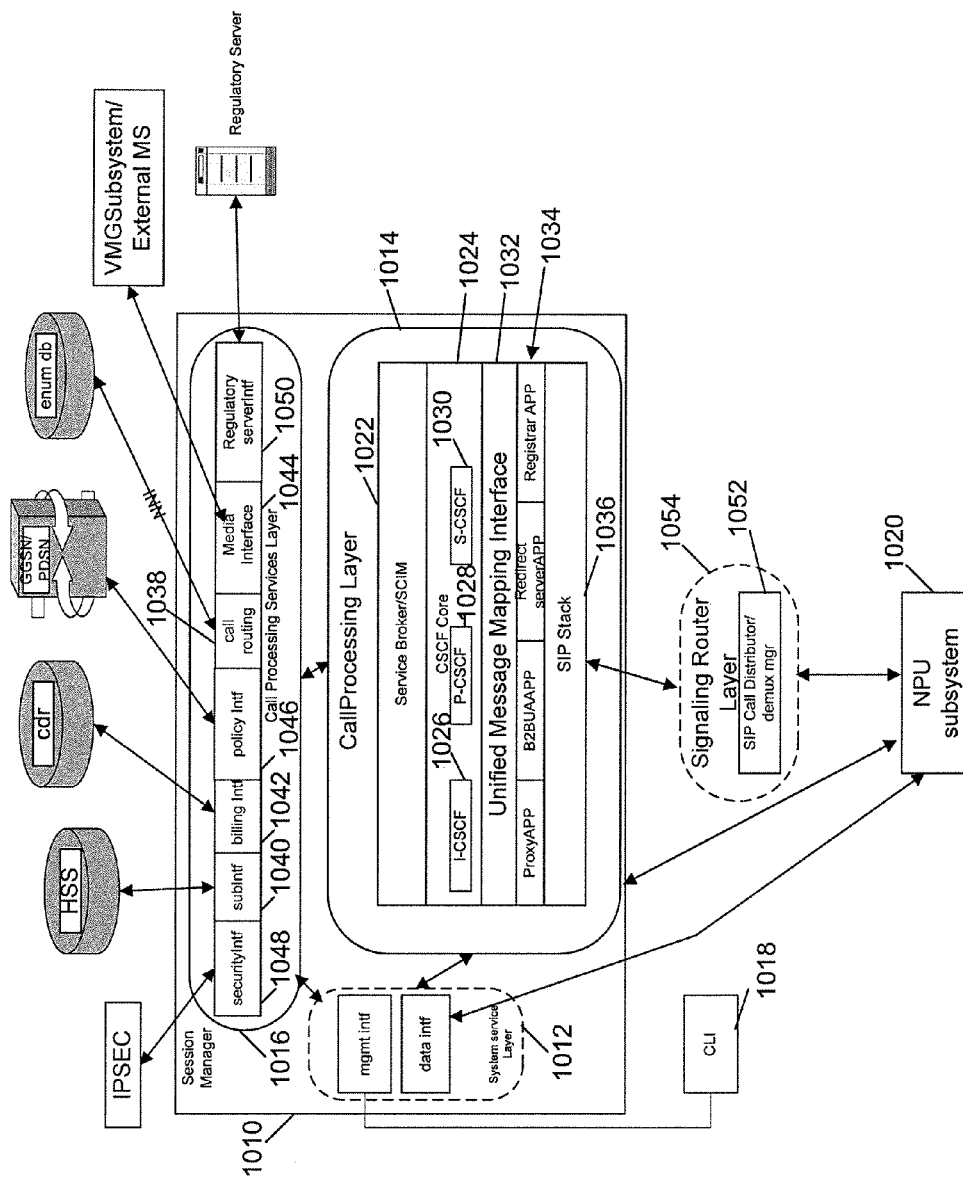
FIG. 10 is a block diagram illustrating modules running on a gateway in accordance with certain embodiments.

FIG. 10 illustrates a control plane architecture that can be used to implement dynamic QoS in a gateway in accordance with certain embodiments. A session manager 1010 services and processes user session data flow for user equipment/mobile subscribers. Session manager 1010, which is the same session manager as described above, includes functional layers such as a system service layer 1012, a call processing layer 1014, and a call processing support services layer 1016. The system services layer 1012 provides an interface for instructions to be passed to the session manager and the other layers. A command line interface (CLI) 1018 can be provided. Network processing unit 1020 can be used to provide packet flows and for other processing. The call processing layer 1014 includes a service broker/Service Control Interaction Manager (SCIM) 1022, a CSCF core 1024 that includes an I-CSCF 1026, P-CSCF 1028, and S-CSCF 1030, a unified message mapping interface 1032, applications 1034, and a SIP stack 1036. Applications 1034 includes a registrar function. The registrar function caches information relating to the subscriber and the session enabling lookup of information without having to query external databases. In some embodiments, the CSCF core includes one of the CSCF functionalities, for example, the P-CSCF. The call processing support services layer 1016 includes a variety of services such as routing and address translation service 1038, subscriber management service 1040, changing interface service 1042, media interface service 1044, QoS policy interface service 1046, security interface 1048, and regulatory server interface 1050.

Looking at the call processing layer 1014, this layer includes signaling protocols and call control using universal SIP as an application program interface (API). The signaling protocols can be SIP or can be other protocols like ISUP, MGCP, or H.323. Further, the call processing layer 1014 allows interworking between SIP variants and other protocols through a unified mapping interface. The unified mapping interface can convert protocol specific messages and parameters to a universal SIP like API format. SIP like messaging is used, in some embodiments, because SIP has the largest message set and can cover the possible messaging scenarios for SIP and the other protocols. The call processing layer 1014 can also provide transparency to data that need not be processed by the CSCF core by placing that information into an envelope. Parameters that are not of interest can be placed in an envelope and remain unmodified. The CSCF core allows any text sting as the calling and called number, and the number does not need to be restricted to an E.164 number. The number could be, for example, an Address of Record (AoR) or any name string with a domain name.

A demux manager 1052 resides in the signal routing layer 1054, as shown in FIG. 10. The signal routing layer 1054 with the demux manager can determine where a packet flow is sent for processing. The packet flow can be sent to a process instance for further processing and/or signal handling. The demux manager can be used to analyze packet flows or traffic entering into a gateway. This analyzing may encompass packet sniffing, extracting of information from packet headers, sorting extracted information, deep packet inspection, and processing of information obtained from one or more packets. Messages analyzed by a demux manager can contain information which can be extracted (or sniffed) such as an IP-address assigned to the mobile node, a network access identifier (NAI), an international mobile subscriber identity (IMSI), a mobile subscriber identification (MSID), a correlation-ID (for CDMA implementations), a user data record (UDR), event data records (EDR), a calling-station-ID, and/or any other applicable information. In some embodiments, a version of the demux manager can be used as a RTSP proxy.

In certain embodiments, a dynamic QoS mechanism is provided. The QoS mechanisms provided by the standards are static. The network devices such as the CSCF/SIP-AS look at the service requested, this is matched to the terminal capabilities, and a QoS profile is issued. Such a scheme works well with wireline access where the overall bandwidth to the end user is fairly constant. However, such schemes may not work in wireless access networks due to the inherent dynamic nature of an "over the air" or airlink connection. Wireless connections are prone to swings in effective data rate, latency, and jitter (e.g., when a user is traveling in a car, steps close to a microware device, etc.). This creates future issues for mobile applications for delivering quality of service to the user equipment/mobile subscriber (or mobile node).

In some embodiments, a feedback component is introduced into the QoS mechanisms. A CSCF can issue a QoS profile based on a class of service and monitor the application of the QoS. The CSCF can receive feedback either passively, that is the phone sends information on an interval to provide airlink information or bandwidth received information, or the CSCF or other entity can request information. The information requested can be a known set of data, that can be processed to determine the airlink bandwidth. In some embodiments, the mobile node sends an agreed upon metric that allows the CSCF to determine how to adjust the bandwidth allocated to the mobile node. In certain embodiments, the feedback from the mobile node is fed into a function that can re-apply the QoS parameters to keep the service within the desired operational parameters. In other embodiments, the data flow can be modified in other ways such as sending redundant packets, employing an error correcting code, or dropping the frame rate on video or other streaming media.

In accordance with some embodiments, a continuing feedback is provided from the mobile node back to a QoS monitor function in the CSCF. The function can be service aware and apply the feedback to tweak the QoS. For example, in case of video on demand, this function could change the 1) frame rate; 2) I-frame interval; or 3) Discrete cosine transform (DCT). DCT is a lossy compression algorithm that samples an image at regular intervals, analyzes the frequency components present in the sample, and discards those frequencies which do not affect the image as the human eye perceives it. DCT is the basis of standards such as JPEG, MPEG, H.261, and H.263.

The gateway described above is implemented in a chassis in some embodiments. This chassis can implement multiple and different integrated functionalities. In some embodiments, an access gateway, a packet data serving node (PDSN), a foreign agent (FA), or a home agent (HA) can be implemented on a chassis. Other types of functionalities can also be implemented on a chassis in other embodiments are a Gateway General packet radio service Support Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

The chassis can include slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing embodiments, it is understood that the present disclosure has been made only by way of example, and that numerous changes in the details of implementation of the invention may be made without departing from the spirit and scope of the invention, which is limited only by the claims which follow.

We claim:

1. A gateway in a communication network comprising:
 a proxy instance residing in the gateway that inspects packets received from at least one mobile node to detect information regarding setup of a media stream and information regarding a level of quality of service (QoS) of an existing media stream, wherein the gateway is in communication with a media server and provides packet routing and session management for the at least one mobile node, the media stream using a first access technology;
 an inline service residing in the gateway and in communication with the proxy instance that:
  responsive to detection of the information regarding the level of QoS, provides dynamic changes to the QoS by re-negotiating a session with a first mobile node to adjust media stream parameters, the first mobile node having mobile node characteristics and being associated with a user identity,
  responsive to detection of the information regarding setup of the media stream, monitors the media stream for information indicating that the user identity has changed associations to a second mobile node having different mobile node characteristics and handover information indicating that the media stream has changed to use a second access technology associated with a handover of the either of the first mobile node or second mobile node from the first access technology to the second access technology, and
  manages transcoding; and
 a digital signal processor (DSP) residing in the gateway and in communication with the inline service that transcodes at a direction of the inline service, including changing media stream parameters to provide a dynamic upgrade or downgrade of QoS level and converting the media stream from a first format received from the media server to a second format sent to either the first mobile node or second mobile node based at least in part on the information indicating user identity change including the characteristics of whichever of the first mobile node or second mobile node the user identity is associated with and the handover information including characteristics of whichever of the first access technology or second access technology the media stream is using.

2. The gateway of claim 1, wherein:
the proxy instance inspects real-time streaming protocol (RTSP) packets for the setup of a session; and
the inline service inspects real-time control protocol (RTCP) packets for feedback from the first mobile node for the level of QoS of an existing session.

3. The gateway of claim 1, further comprising the proxy instance detecting a setup of a media stream, modifying message received to pass the media stream through an inline service, and setting up an inline service to manage the media stream.

4. A method comprising:
inspecting packets received from at least one mobile node, at a gateway that provides packet routing and session management for the at least one mobile node, to detect information regarding a setup of a media stream to a first mobile node and information regarding a level of Quality of Service (QoS) of an existing media stream, the first mobile node having mobile node characteristics and associated with a user identity, the media stream using a first access technology;
modifying setup messages, at the gateway, to pass the media stream through an inline service in communication with the gateway;
responsive to detection of the information regarding the level of QoS, providing, at the inline service, dynamic changes to the QoS by renegotiating a session with the first mobile node to adjust media stream parameters;
responsive to detection of the information regarding the setup of the media stream, monitoring, at the inline service, the media stream for information indicating that the user identity has changed associations to a second mobile node having different mobile node characteristics and handover information indicating that the media stream has changed to use a second access technology associated with a handover of the either of the first mobile node or second mobile node from the first access technology to the second access technology;
transcoding, at a digital signal processing (DSP) engine and at a direction of the inline service, the media stream including changing media stream parameters to provide a dynamic upgrade or downgrade of QoS level and converting the media stream from a first format received from a media server to a second format sent to either the first mobile node or second mobile node based at least in part on the information indicating user identity change including the characteristics of whichever of the first mobile node or second mobile node the user identity is associated with and the handover information including characteristics of whichever of the first access technology or second access technology the media stream is using.

5. The method of claim 4, wherein real-time streaming protocol (RTSP) packets are inspected to detect setup of a media stream and real-time control protocol (RTCP) packets are monitored to obtain feedback from the first mobile node.

6. The method of claim 4, further comprising:
receiving instructions from a policy and charging rules function (PCRF); and
dynamically changing, at a media server in communication with the gateway and as directed by the gateway, a quality of service (QoS) delivered to whichever of the first mobile node or second mobile node the user identity is associated with.

* * * * *